United States Patent [19]

Millward

[11] 4,184,177
[45] Jan. 15, 1980

[54] TELEVISION APPARATUS FOR CONSECUTIVE FRAME SCANNING OF CONTINUOUS MOTION FILM

[75] Inventor: John D. Millward, Hitchin, England

[73] Assignee: The Rank Organisation Limited, London, England

[21] Appl. No.: 865,782

[22] Filed: Dec. 30, 1977

[30] Foreign Application Priority Data

Jan. 27, 1977 [GB] United Kingdom ............... 3337/77

[51] Int. Cl.$^2$ .............................................. H04N 3/36
[52] U.S. Cl. .................................................. 358/214
[58] Field of Search ................... 358/214, 215, 11, 54, 358/216, 130–132

[56] References Cited

U.S. PATENT DOCUMENTS 3,041,390  6/1962  Horsley ................................ 358/215

Primary Examiner—John C. Martin
Attorney, Agent, or Firm—Brisebois & Kruger

[57] ABSTRACT

The invention concerns a flying spot telecine apparatus wherein the film is driven at constant speed with a film frame rate which is not exactly half the television field frequency, for example at 24 frames per second where the field frequency is 60 fields per second. To avoid registration problems only one scan of each film frame is made, preferably a sequential scan, and the video processing circuits comprise a storage arrangement into and from which picture information derived from the said one scan is stored and extracted in a desired sequence for producing the necessary number of fields for a complete television signal. To simplify the organisation of the storage arrangement, particularly where the vertical amplitude is adjustable to allow for different film formats, the apparatus comprises means for generating synchronising signals at the desired film frame rate, these signals then being used to synchronise not only the motion of the film but also the vertical deflection of the flying spot and the operation of the storage arrangement.

5 Claims, 4 Drawing Figures

TELEVISION APPARATUS FOR CONSECUTIVE FRAME SCANNING OF CONTINUOUS MOTION FILM

This invention relates to a flying spot telecine apparatus.

A flying spot telecine apparatus is, for the purposes of the present specification, defined as an apparatus in which consecutive frames of a cinema film are optically scanned in raster fashion by a light beam of small cross-section (flying spot), the picture information thereby modulated on the light beam is converted by one or more opto-electronic detectors into electrical video signal form, and from the electrical video information there is derived by video processing circuits a television signal of which consecutive groups of television fields contain picture information derived from scanning respective consecutive film frames.

In flying spot telecines for the United States 525 line/60 field television system the cinema film is driven at 24 frames per second and the consecutive groups of fields contain three and two fields alternately, and in the European 625 line/50 field television system the film is driven at 25 frames per second and the consecutive groups of fields contain two fields each. In both television systems the television signal is interlaced which means that each complete television picture of 625 or 525 lines is composed of two successive fields (known as a television frame) of $313\frac{1}{2}$ and $262\frac{1}{2}$ lines each respectively, the lines of the two fields being interlaced upon reproduction on the television screen to produce 625 or 525 lines.

Existing commercially available flying spot telecines are one of two types—intermittent film motion and continuous film motion. The intermittent type at present can handle only a limited range of film sizes satisfactorily, and even so wear and tear is a problem. The continuous type generally uses either twin lens scanning, which cannot however be used on the United States 525/60 system where the field frequency is not twice the film frame rate, or the jump scan technique which suffers from the disadvantage of requiring very accurate registration of two field scans on the 625/50 system and five field scans on the 525/60 system. It is generally thought that a flying spot telecine with continuous film motion would provide the simplest and best telecine if the problems of field to field registration could be overcome.

One method of overcoming this problem would be to scan each film frame once only in sequential mode, and convert to interlaced mode after scanning. In conventional interlaced scanning, both in flying spot telecines and television camera tubes, alternate lines only are scanned in the first field of each television frame and the intervening lines are scanned in the second field of the television frame. Thus the lines are scanned in the order in which they are reproduced on the television screen. The major problem with the interlaced scanning in flying spot telecines with continuous motion is registration, as mentioned above. Due to the movement of the film during the interval between the interlaced scans the scan has to be moved very accurately to follow the film to maintain accurate registration of the two interlaced fields. In sequential scanning, however, the lines are scanned not in the order in which they are reproduced on the screen but in the order in which they are positioned on the screen—i.e. they are scanned in sequence and not alternately. Thus the scanning raster used for sequential scanning has twice the number of lines (and half the line spacing) as that used for interlaced scanning, but since the sequential scan takes place over two television fields the horizontal or line frequency is the same. Clearly, since domestic television receivers are adapted to handle interlaced signals only, the lines of picture information derived by sequential scanning must be transposed into interlaced form prior to transmission. This can be done by storing the sequential signal and withdrawing the lines from storage in the appropriate order. This operation can be performed, in the case of a colour television signal, either upon the individual colour value signals derived from the detection of the modulated flying sopt or after encoding the signals in conventional manner.

Although the sequential scanning approach solves the problem of registration, since each frame is scanned once only, a problem exists in relation to the storage organisation of such systems operating according to the 525 line/60 field system, particularly where the vertical scan amplitude is variable to accommodate film format changes.

According to the invention there is provided a flying spot telecine apparatus comprising means for driving a cinema film with continuous motion past a scanning position at a film frame rate which is not exactly half the television field frequency, means for optically scanning consecutive frames of the cinema film in raster fashion with a light beam of small cross-section, optoelectronic detector means for converting the picture information thereby modulated on the light beam into electrical video signal form, and video processing circuit means for deriving from the electrical video information a television signal comprising consecutive groups of television fields containing picture information derived from scanning respective consecutive film frames, the improvement wherein the scanning means is adapted to make one scan only of each film frame, wherein the video processing circuits comprise a storage arrangement into and from which picture information derived from the said one scans is stored and extracted in a desired sequence for producing the said television signal, and wherein the vertical deflection of the scanning raster, the motion of the film, and the operation of the storage arrangement are each synchronised by a common synchronising signal generated at the desired film frame rate.

When applied to a sequential scan system the invention considerably simplifies the storage organisation of the apparatus. The invention is, however, also applicable to the single field scan system described and claimed in our copending application U.S. application Ser. No. 865,773, filed Dec. 30, 1977.

Embodiments of the invention will now be described, by way of example, with reference to the accompanying drawings, in which.

Figure 1:
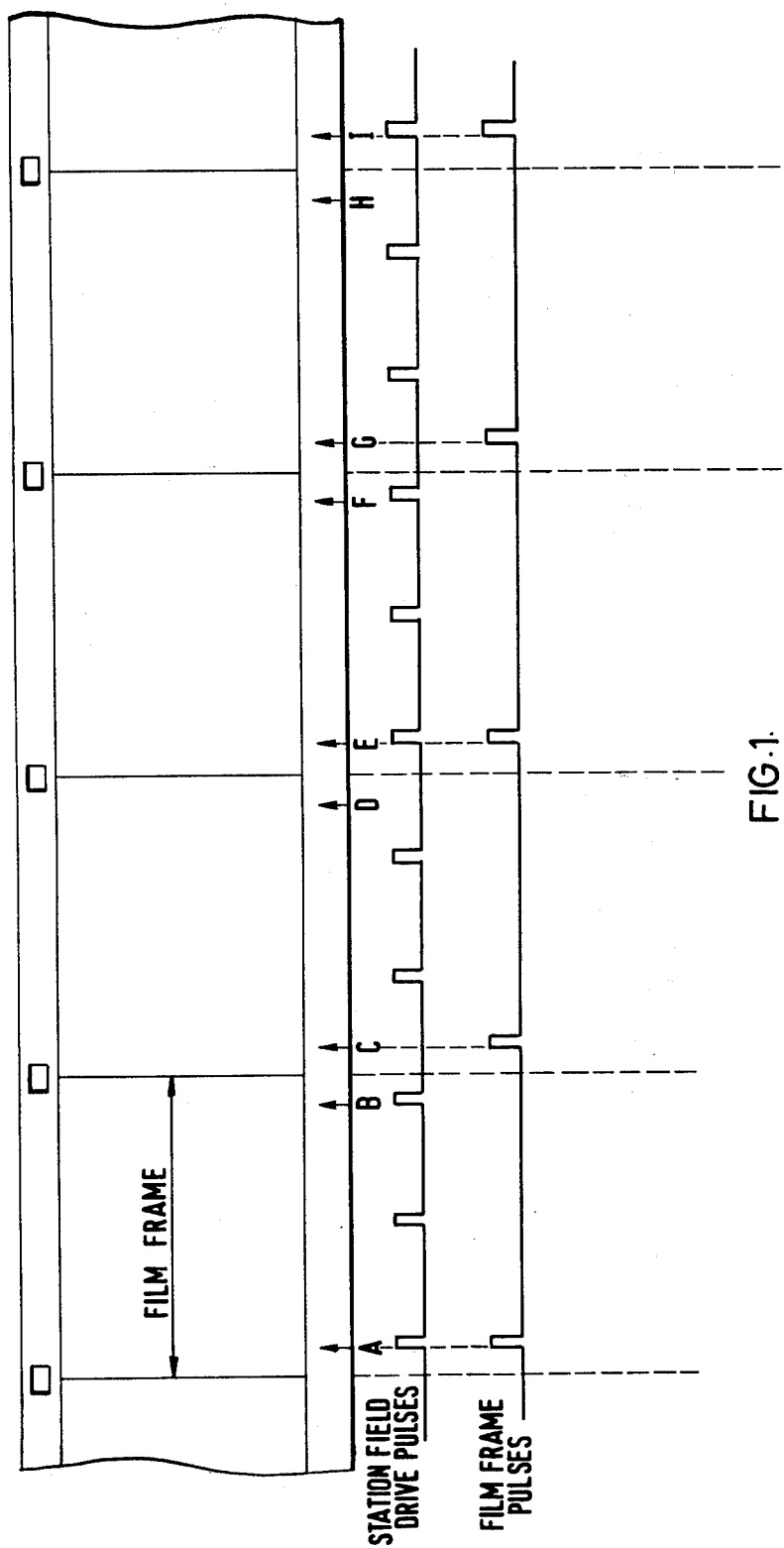
FIGS. 1 and 2 are timing diagrams illustrating the abovementioned storage organisation problem with a 525/60 system and the principles of the invention.

The film speed for 525/60 operation is 24 frames per second and, referring to FIG. 1, first consider the results of zero vertical scan amplitude on the flying spot tube. It is simpler to consider the film stationary and the centre of the flying spot tube moving past the film from left to right. The horizontal scan is assumed to operate at normal speed; therefore as we move from A to B, which is two field periods, 525 lines would be scanned giving a complete picture which would be written sequentially into a store, the store being synchronised or addressed by the film frame pulses shown in FIG. 1. These pulses are derived from the station sync generator and have a period equal to two and a half television fields and are also used to synchronise the film motion. No information is fed to the store between B and C which is exactly half of a field period as there are $2\frac{1}{2}$ television fields per film frame. The next frame is scanned between C and D and so on. It will be noted that A, C, E, G, I, etc., are identical points on each film frame which are written into the same or parallel store locations as determined by the film frame pulses, which have a constant phase relationship to points A,C,E,G,I. Therefore readout of the stored information in interlaced form is comparatively easy with fixed locations for the stored lines.

When point E is reached, four television fields have been written into the store but five fields need to be read out, and therefore every alternate film frame one of the fields in the store is repeated to produce the standard 525/60 picture. This corresponds to the normal practice with present telecines where the film frames are scanned alternately two and three fields.

The above assumed no vertical scan on the flying spot tube, so that only part of the film frame between A and B, C and D, etc., is scanned. To scan the whole film frame, therefore, vertical scan is required.

Figure 2:
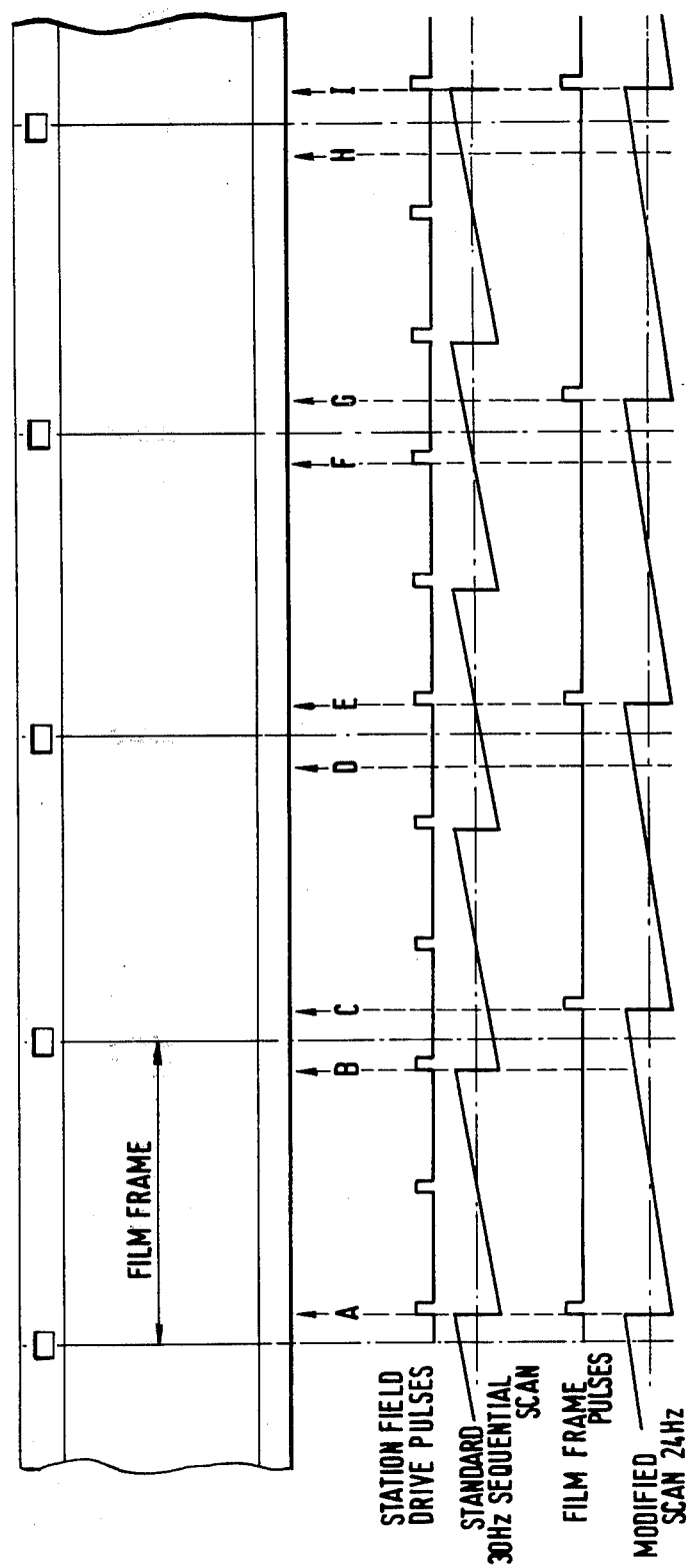

If a standard 30 Hz sequential scan is employed for this purpose, as shown in FIG. 2, it can be seen that the flying spot position is different at points A, C, E and G even though the vertical scan amplitude is constant. To see this imagine the centre of the flying spot tube is at A, C, E, G and the flying spot position is spaced from A, C, E, G, by the amplitude of the sequential scan. Therefore if we consider the T.V. lines written into the store on the leading edge of each film frame pulse, we see that instead of identical points A, C, E, G on the film frame, we have points of differing distances from A, C, E, G depending upon the deflection position and therefore the organisation of store locations becomes more complex. A further complication arises if the vertical scan amplitude is changed, since the distances from points A, C, E, G change yet again requiring different store locations. Therefore we can see that as the vertical scan amplitude is varied the organisation of the store will require continuous modification.

The vertical scan amplitude variation is a facility commonly used in flying spot telecines for scanning cinemascope film with varying formats.

The solution is to operate the vertical timebase at film frame rate (24 Hz) instead of the 30 Hz normal sequential rate.

Again referring to FIG. 2, it can be seen that the deflection position of the modified 24 Hz scan at points A, C, E, G is constant and therefore the points scanned are a fixed distance from points A, C, E, G and therefore represent the same points on the film frame. Furthermore, if the vertical scan amplitude is changed, a different part of the picture is scanned at a time coincident with the leading edge of the film frame pulses, but it is an identical part in each film frame, therefore no re-organisation of the store is necessary, and a constant writing and reading sequence can be employed.

Figure 3:
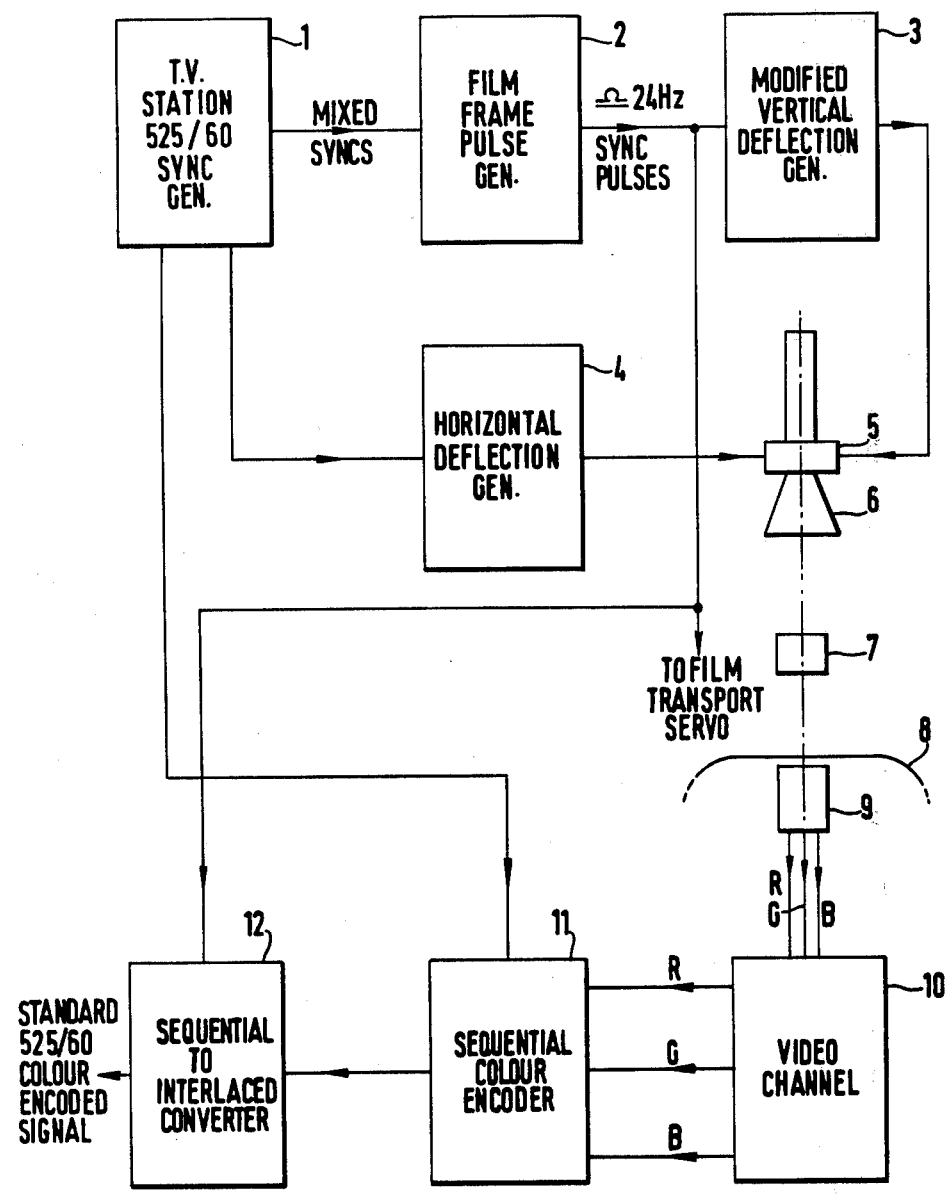
FIG. 3 is a block diagram of a first embodiment of the invention.
Figure 4:
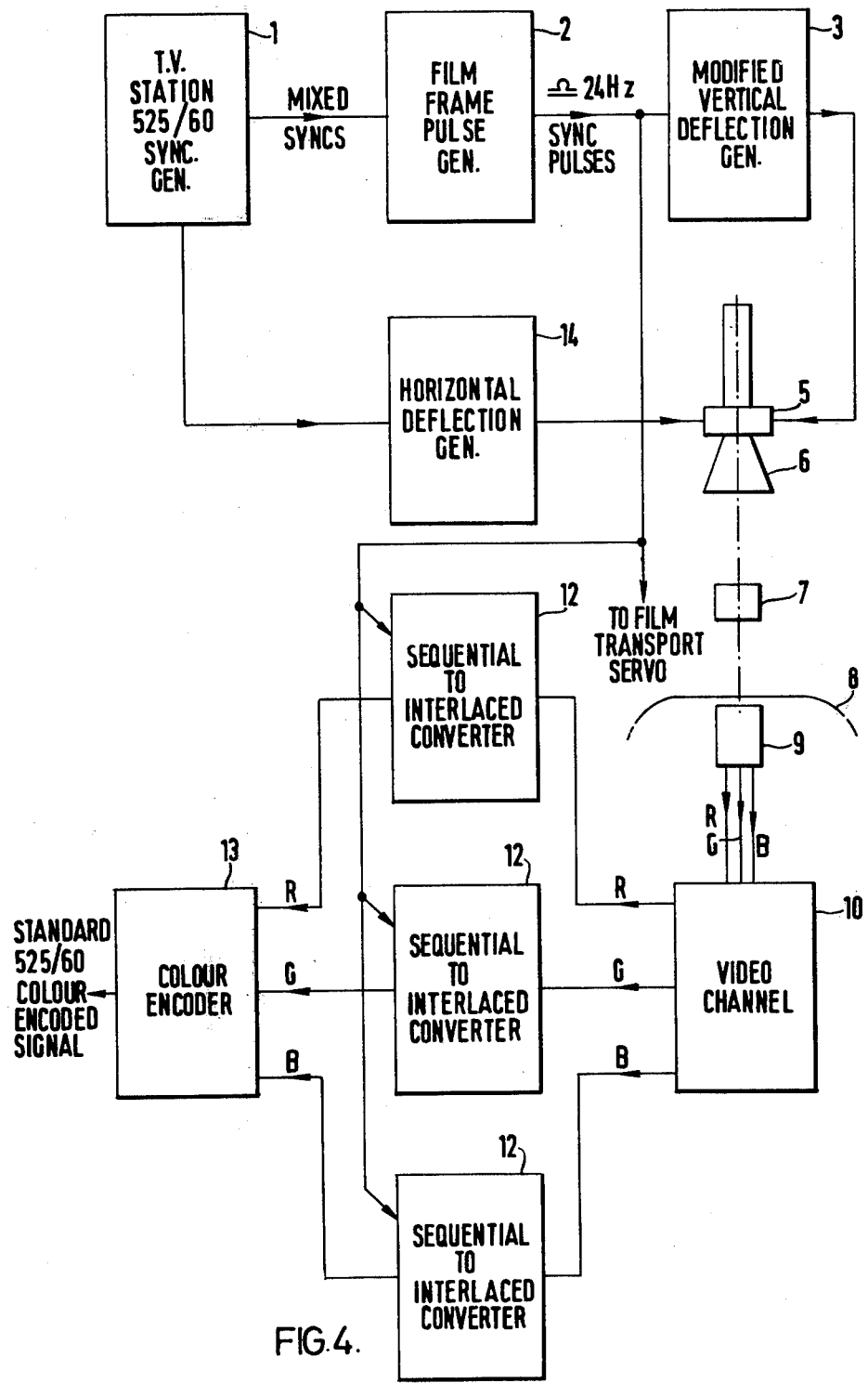
FIG. 4 is a block diagram of a second embodiment of the invention.

FIGS. 3 and 4 show two alternative embodiments of the invention, both operating on the 525/60 standard, the only difference being that FIG. 4 uses separate sequential to interlaced converters for the red, green, and blue video signals before colour encoding to avoid the use of a special sequential colour encoder.

In FIG. 3, reference 1 represents a conventional 525/60 television station sync generator which is used for synchronising all picture sources in the usual manner, and is not to be regarded as part of the telecine apparatus itself. A film frame pulse generator 2 accepts synchronising pulses from 1 and generates 24 Hz pulses necessary to synchronise the modified (i.e. 24 Hz) vertical deflection generator 3. The vertical scan amplitude is preferably variable to accommodate film format changes. The horizontal deflection generator 4 operates at conventional horizontal frequency for the 525/60 standard and is also synchronised by the station sync generator 1.

The horizontal deflection generator 4 and the modified vertical deflection generator 3 in conjunction with the scan deflector 5 produce a flying spot raster on the cathode ray tube 6 which is focussed on the film 8 by a lens system 7. The film 8 is driven with continuous motion at a constant 24 film frames per second by a servomechanism of known type (not shown) synchronised by the 24 Hz pulses from the pulse generator 2. As discussed in connection with FIG. 2, the components 3, 4 and 5 are arranged for sequential scanning of the film frames.

Photocells 9 produce red, green and blue video (colour value) signals which are processed in known manner by the video channel 10 and the sequential colour encoder 11 to form a single colour encoded signal. Finally, the colour encoded signal is converted to normal 525/60 standards by the sequential-to-interlaced converter 12.

The principles of sequential to interlaced conversion as used in the converter 12 are well known. The converter 12 basically comprises a storage arrangement in which lines of information derived by the scanning are read into storage in the order of scanning (sequential order) and extracted from storage in interlaced order, one field being repeated on alternate frames. The present converter 12 is, however, synchronised by the 24 Hz film frame pulses from the generator 2 rather than 30 Hz pulses as in conventional telecines, this being necessary on account of the 24 Hz modified vertical scan wave form.

In the embodiment of FIG. 4, most of the components are the same as in FIG. 3 and need not be described again. The difference in the embodiments is that the individual colour signals are converted to the 525/60 standard in respect of line frequency and interlacing before colour encoding. Thus three sequential-to-interlaced converters 12 are used, one for each colour signal, and a standard colour encoder 13 is used rather than the sequential encoder 11 of FIG. 3.

I claim:
1. In a flying spot telecine apparatus comprising means for driving a cinema film with continuous motion past a scanning position at a film frame rate which is not exactly half the television field frequency, means for optically scanning consecutive frames of the cinema film in raster fashion with a light beam of small cross-section, optoelectronic detector means for converting the picture information thereby modulated on the light beam into electric video signal form, and video process- ing circuit means for deriving from the electrical video information a television signal comprising consecutive groups of television fields containing picture information derived from scanning respective consecutive film frames, the improvement wherein the scanning means is adapted to make one scan only of each film frame, wherein the video processing circuits comprise a storage arrangement into and from which picture information derived from the said one scans is stored and extracted in a desired sequence for producing the said television signal, and wherein the vertical deflection of the scanning raster, the motion of the film and the operation of the storage arrangement are each synchronised by a common synchronising signal generated at the desired film frame rate.

2. A flying spot telecine apparatus as claimed in claim 1, wherein the film driving means is adapted to drive the film at 24 frames per second, the television field frequency is 60 fields per second, and the consecutive groups of fields contain alternately two and three television fields.

3. A flying spot telecine apparatus as claimed in claim 2, wherein the one scan of each film frame is a sequential scan.

4. A flying spot telecine apparatus as claimed in claim 3, wherein the storage arrangement comprises means for converting sequential picture information into interlaced form.

5. A flying spot telecine apparatus as claimed in claim 4, wherein the vertical amplitude of the scan is variable.

* * * * *